United States Patent
Selig

[11] 3,727,731
[45] Apr. 17, 1973

[54] FLUID OPERATED CLUTCH AND SPRING OPERATED BRAKE

[75] Inventor: Hans Selig, Remscheid, Germany

[73] Assignee: Firma Gebruder Ortlinghaus Ohg., Wermelskirchen, Germany

[22] Filed: Jan. 31, 1971

[21] Appl. No.: 222,140

[30] Foreign Application Priority Data

Feb. 10, 1971 Germany..................P 21 06 260.2

[52] U.S. Cl..................192/18 A, 192/87.17, 92/165
[51] Int. Cl.............................................F16d 67/04
[58] Field of Search..............192/18 A, 12 C, 87.16, 192/87.17

[56] References Cited

UNITED STATES PATENTS 3,200,917 8/1965 Herr et al. ..........................192/18 A
3,469,664 9/1969 Ortlinghaus et al. ...............192/18 A Primary Examiner—Benjamin W. Wyche
Attorney—Michael S. Striker

[57] ABSTRACT

In a combined clutch and brake apparatus, a pressure means is shifted by a piston and a spring between two positions for frictionally coupling a casing, whose hub portion is connected with a shaft, either with a rotary friction means or with a blocked friction means. Bolts connect the casing end walls, and pass through the cylinder chamber, a piston in the cylinder chamber, and the pressure means which is biassed to abut the piston, and is shifted by pressure fluid in the cylinder chamber in one direction, and by a spring in the opposite direction. Due to the position of the bolts, the apparatus is compact, has a small outer diameter, and comparatively wide annular friction faces.

10 Claims, 1 Drawing Figure

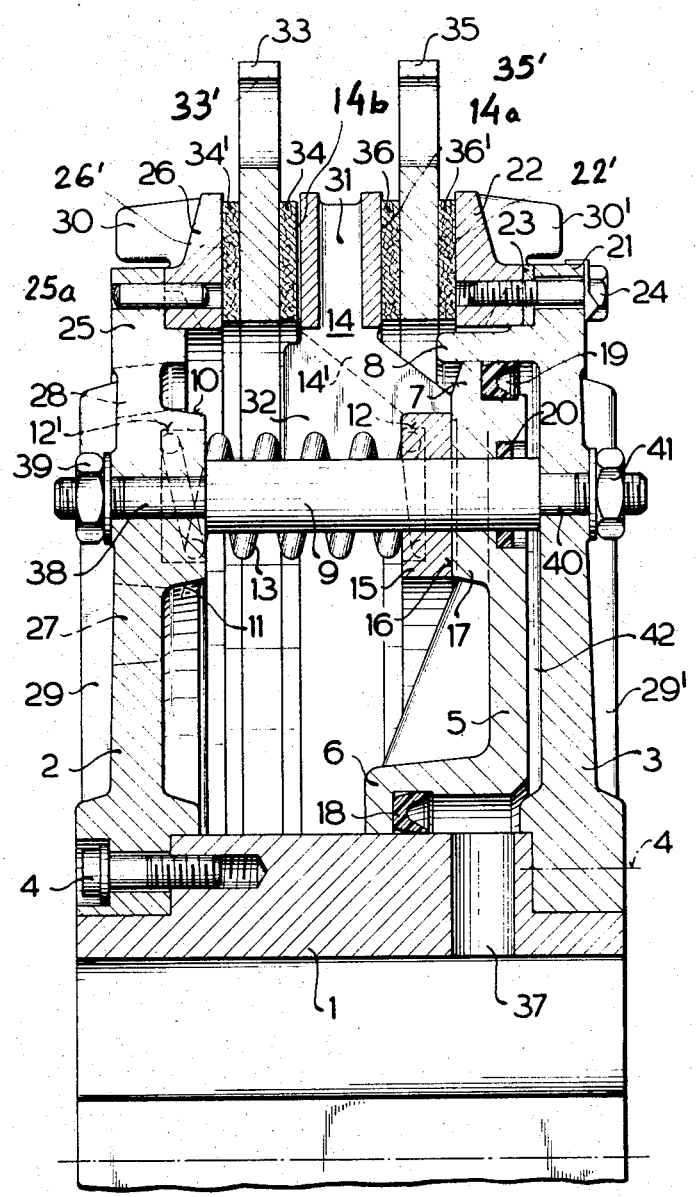

FLUID OPERATED CLUTCH AND SPRING OPERATED BRAKE

BACKGROUND OF THE INVENTION

The present invention relates to a combined clutch and brake apparatus in which an annular piston is located in an annular cylinder chamber and shifts a pressure means against the action of the spring to obtain braking or driving of a shaft.

In a known apparatus of this type, connecting bolts connecting the end walls of a casing whose hub surrounds a shaft, are located outside of the cylinder chamber and the end wall forming the cylinder chamber, and pass through the pressure plate which is integral with the annular piston. The apparatus of the prior art requires a comparatively great outer diameter since an annular zone between the annular cylinder and the friction surfaces is required for the connecting bolts. A large outer diameter is unfavorable due to great interia forces, and consequently limits the efficiency of the apparatus, assuming that a maximum outer diameter of the apparatus is given.

SUMMARY OF THE INVENTION

It is one object of the invention to increase the efficiency of clutch and brake apparatus of the prior art, and to provide a clutch and brake apparatus of compact construction operating at high efficiency. With these objects in view, the connecting bolts between the end walls of the casing, pass through the annular cylinder chamber, and also through the annular piston which is provided with suitable bores which are preferably sealed by sealing rings. The pressure means by which the friction means are actuated, are also guided by means of bores on the axially extending bolts.

The placing of the connecting bolts within the annular cylinder chamber has a favorable effect on the ratio between the outer diameter of the clutch and brake apparatus to the width of the zone available for friction faces.

It is also an advantage that the pressure plate is guided for movement between the braking position and the driving position by the connecting bolts, without requiring the guidance of the annular piston in the annular cylinder chamber, in the manner of the prior art. Consequently, it is sufficient that the pressure plate is spring biassed into abutment with the annular piston, and need not be supported by the annular piston.

The spring means, which are anyway required for the operation of the pressure plate, can directly abut the pressure plate which is guided on the connecting bolts in accordance with the invention. The supporting effect of the connecting bolts between the two end walls of the casing is not detrimentally effected by the construction of the invention. It is possible to construct essential parts of the apparatus of comparatively weak metals, such as aluminum.

It is advantageous to provide yielding sealing means for sealing the bores in the annular piston through which the connecting bolts pass. Cuff-like sealing means, or folded sealing means may be used. Mounting of the annular piston on the connecting bolts with play, requires guidance of the piston by the wall of the annular cylinder, which is favorable for the manufacturing process because edging or binding of the piston is avoided.

It is preferred to arrange the connecting bolts, as well as the springs which biass the pressure plate, on the same circle.

As noted above, the placement of the connecting bolts within the region surrounded by the outer wall of the annular cylinder chamber, is favorable for the width of the annular friction surfaces. For utilizing this possibility, the present invention provides annular friction means whose inner diameter is slightly greater than the outer diameter of the outer annular wall of the annular cylinder chamber. Some play should be provided so that an engagement between a friction element and the outer surface of the outer annular cylinder wall is reliably avoided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE of the drawing is an axial sectional view showing only the upper part of a combined clutch and brake appararatus according to an embodiment of the invention, with circumferentially spaced springs and connecting bolts shown at the same radial height for the sake of simplicity.

DESCRIPTION OF THE PREFERRED EMBODIMENT

The casing of the apparatus includes a hub portion 1 which is mounted on the shaft, not shown, of a press or cutting machine, or the like, which requires intermittent braking and driving which is accomplished by means of the non-rotatable connection between the hub 1 and the shaft therein, not shown.

The casing has in addition to hub 1 two end walls 3 and 2 which are secured by a plurality of circumferentially spaced screws 4, only one of which is shown in detail. Near the outer periphery of end wall 3, a circular cylinder wall 8 projects inwards in radial direction, and forms, together with a surface portion of the outer peripheral surface of hub 1, and with the annular end wall 3, a cylinder chamber 42 which communicates with a radial passage 37 passing through hub 1, and being adapted to receive and discharge pressure fluid under the control of ports in the shafts, not shown, surrounded by hub 1. The annular peripheral outer portion 21 of end wall 3 is penetrated by a bore through which screws 24 pass into threaded bores of an annular flange 22 mounted on the outside of the cylinder wall 8. A corresponding annular flange 26 is mounted on the peripheral outer portion 25 of end wall 2. A pin 25a is shown to connect annular flange 26 with annular portion 25, and such pins may alternate with screws 24.

The annular flanges 22 and 26 have confronting annular friction faces 22' and 26'.

End wall 3 has substantially radial fins 29' which reinforce end wall 3 and also produce cooling air streams when casing 1, 2, 3, 22, 26 rotates. Annular flanges 22 and 26 have corresponding fins 30 and 30'. A thermo insulating ring 23 is placed between annular flange 22 and the peripheral portion 21 of end wall 3.

End wall 2 also has radially extending fins 29. Between adjacent fins 29, cut-outs 27, 28 are provided for ventilating purposes. The inner diameters of the flanges 22 and 26 are substantially equal, and slightly greater than the outer diameter of the cylinder wall 8, but annular surface portions of annular flanges 22 and 26 abut corresponding shoulders in end wall portion 21 and 25.

End wall 2 has an annular projection bounded by an outer annular shoulder 10 and an inner annular shoulder 11. The annular projection 10, 11 is formed with circumferentially spaced recesses 12' in which the ends of a set of circumferentially spaced coil springs 13 are located. The other ends of springs 13 are located in corresponding recesses 12 provided in an inner annular portion 15 of a pressure means 14, which will be described hereinafter in greater detail.

A set of circumferentially spaced axially extending connecting bolts 9 is provided, having central portions of greater diameter, and threaded end portions 38 and 40 which pass through bores in end walls 2 and 3, respectively, and are secured by nuts 39 and 41 so that the shoulders between the thicker central portion and the thinner end portions 38, 40 of connecting bolts 9 abut the inner surfaces of the projection 10, 11 of end wall 2, and the inner surface of end wall 3, respectively.

The central portions of connecting bolts 9 pass through corresponding bores in the annular portion 15 of the pressure means 14, so that pressure means 14 is guided for axial movement on connecting bolts 9, and also supported by the same. Pressure means 14 has radial channels 31 and vanes 32 for producing cooling air streams.

The inner annular portion 15 of the pressure means 14 abuts, due to the action of the springs 13, on an annular projection 17 of an annular piston 5 which has an outer peripheral portion 7 guided along the inner cylindrical face of cylinder wall 8 of end wall 3. The central annular portion 6 of piston 5 slidingly engages the outer peripheral surface of hub 1 so that the annular piston 5 is guided for axial movement. Sealing means 18 and 19 are provided between the slide faces of piston 5 and the pressure chamber 42 formed by the annular piston 5 in the end wall 3, together with hub 1.

The bores of piston 5 through which the connecting bolts 9 pass, provide a certain play, and leakage along the connecting bolts 9 is prevented by sealing rings 20 in corresponding recesses of piston 5.

Between the annular friction faces 22' and 26' of the annular flanges 22, 26, and the annular pressure faces 14a and 14b of pressure means 14, two friction means 35 and 33 are mounted. Friction means 35 includes annular linings 26, 26', and friction means 33 includes annular linings 34, 34'. The annular plates of the friction means 33, 35 are provided with axially extending aligned bores 33' and 35' through which axially extending guide rods, not shown, may be provided for supporting the friction means 35, 33 for axial movement when the pressure means 14, 15 is axially displaced. Friction means 35 is non-rotatably, but axially movably, mounted on the supporting structure of the machine, and is used for braking. Friction means 33 is mounted on a continuously rotating driven flywheel, not shown, connected for rotation therewith, but movable in axial direction.

In a normal position shown in the drawing, springs 13 press annular portion 15 of pressure means 14 against the piston 5, 17 so that the same is moved to the right as viewed in the drawing and the cylinder chamber 42 has a minimum volume. Due to displacement of pressure means 14,15, pressure face 14a has shifted the friction means 35 to the right in axial direction until the annular face of lining 36' is firmly pressed against annular friction face 22'. Since annular friction means 35 is non-rotatably mounted on the machine frame, although axially movable, pressure means 15, 16 is stopped, flange 22 is stopped, and the entire casing 2, 1, 3, including flanges 26, 22 is stopped due to the provision of the connecting bolts 9. Braking and stopping of the hub 1 is transmitted to the shaft, not shown, surrounded by hub 1, and the shaft of the machine is braked to a standstill, while the parts of the apparatus assume the position shown in the drawing. If, starting in this position, a pressure fluid, such as compressed air is supplied through radial passage 37 into the cylinder chamber 42, piston 5 is moved to the left as viewed in the drawing, displacing pressure means 15, 14 against the action of springs 13 along the connecting rods 9 so that the annular pressure face 14b engages lining 34 and pushes friction means 33 in axial direction until lining 34' is firmly pressed against the annular friction face 26' of the annular flange 26. In this position, friction means 33 is coupled with end wall 2 and pressure means 14, 15, and through connecting bolts 9 also with end wall 3 so that the continuously rotating friction means 33 rotates the entire casing with hub 1 which transmits rotary motion to the shaft surrounded thereby.

During movement of the pressure means 15, 14 to the left, against the action of spring 13, the pressure face 14b moves away from friction means 35 so that the casing is no longer braked or clamped to the non-rotatable friction means 35.

The arrangement of the connecting bolts 9 within the cylinder chamber 42, and passing through the piston 5 and pressure means 15, 14, permits a great radial width of the several annular friction faces for a given outer diameter of the apparatus. The efficiency of the apparatus is increased, assuming the same outer diameter and diametrical extension of the apparatus.

It will be understood that each of the elements described above, or two or more together, may also find a useful application in other types of clutch and brake apparatus differing from the types described above.

While the invention has been illustrated and described as embodied in a clutch and brake apparatus having end walls connected by connecting bolts which support a piston and a pressure means for axial movement so that the pressure means is either braked, or rotated with the casing, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Clutch and brake apparatus comprising annular casing means including hub means adapted to be non-rotatably mounted on a shaft and having an outer annular hub surface portion, and first and second end wall means radially projecting from the ends of said hub means, said first and second end wall means having confronting annular first and second friction surfaces, said first end wall means forming with said hub surface portion an annular cylinder chamber; annular piston means movable in said annular cylinder chamber; annular pressure means abutting said piston means, and having opposite annular first and second pressure faces confronting said first and second friction faces, respectively, spaced from the same; blocked non-rotatable annular first friction means and driven rotary annular second friction means located between the pair of first pressure and friction faces and the pair of second pressure and friction faces, respectively, and being axially movable by said annular pressure means; spring means urging said pressure means with said piston means to a first position holding said non-rotatable first friction means in frictional engagement with said first friction face of said first end wall means for braking said shaft, said piston means moving said pressure means to a second position holding said second friction means in frictional engagement with said second friction face of said second end wall means when said cylinder chamber is filled with a pressure fluid whereby said shaft is rotated; and a plurality of circumferentially spaced axially extending bolt means connecting said first and second end wall means and passing through said cylinder chamber and through aligned openings in said piston means and said pressure means for guiding said piston means and pressure means for axial movement between said first and second position so that said shaft is either braked or driven.

2. Apparatus as claimed in claim 1 comprising sealing rings surrounding said connecting bolt means for providing a seal between said openings in said piston means and said cylinder chamber.

3. Apparatus as claimed in claim 1 wherein said bolt means are arranged spaced along a circle having a diameter smaller than the outer diameter of said annular piston means.

4. Apparatus as claimed in claim 1 wherein said bolt means are arranged spaced along a circle; and wherein said spring means include a plurality of springs arranged along said circle, each spring having a first end abutting said pressure means and a second end abutting said second end wall means.

5. Apparatus as claimed in claim 1 wherein said first wall means includes an annular wall portion parallel to said hub surface portion and forming said cylinder chamber with said hub surface portion and with said first wall means.

6. Apparatus as claimed in claim 5 wherein said first and second wall means include first and second annular peripheral flange portions having said first and second annular friction faces; and wherein said first annular friction face has an inner diameter slightly greater than the outer diameter of said annular wall portion; and wherein said first peripheral flange surrounds said annular wall portion.

7. Apparatus as claimed in claim 1 wherein each of said bolt means includes a smooth central portion for guiding said pressure means and said piston means, and threaded end portions having a smaller diameter than said central portion and passing through said first and second end wall means, and nuts on said threaded end portions pressing said first and second wall means against annular shoulders formed on said bolt means between said central portion and said end portions.

8. Apparatus as claimed in claim 1 wherein said hub means is formed with a channel connecting the inner surface of said hub means with said cylinder chamber so that pressure fluid can be supplied to and discharged from said cylinder chamber by ports in said shaft.

9. Apparatus as claimed in claim 1 wherein the inner diameters of said annular first and second friction faces, of said first and second pressure faces, and of said first and second friction means are substantially equal, and greater than the other diameter of said cylinder chamber.

10. Apparatus as claimed in claim 1 wherein said first and second end wall means include first and second end walls secured to said ends of said hub means, peripheral first and second annular flanges having said first and second friction faces, and threaded means for securing said first and second annular flanges to the peripheries of said end walls; and wherein said pressure means includes an inner annular portion having said openings for said bolt means and an outer annular portion located between said first and second friction means and having said first and second pressure faces.

* * * * *